United States Patent [19]

Brandt

[11] Patent Number: 4,811,757
[45] Date of Patent: Mar. 14, 1989

[54] DISCHARGE VALVE FOR COMPRESSOR

[75] Inventor: George W. Brandt, Tyler, Tex.

[73] Assignee: American Standard Inc., New York, N.Y.

[21] Appl. No.: 151,035

[22] Filed: Feb. 1, 1988

[51] Int. Cl.⁴ ............................................. F16K 15/08
[52] U.S. Cl. ................................ 137/514.5; 137/516.17
[58] Field of Search ................. 137/514, 514.5, 516.15, 137/516.17, 516.19, 516.21, 516.23

[56] References Cited

U.S. PATENT DOCUMENTS

| 1,385,137 | 7/1921 | Kauffmann | 137/516.23 |
| 2,150,808 | 3/1939 | Noble |  |
| 3,066,856 | 12/1962 | Frank | 137/512.15 X |
| 3,939,867 | 2/1976 | Lundvik et al. |  |

FOREIGN PATENT DOCUMENTS

| 1063206 | 12/1953 | France | 137/516.15 |
| 104774 | 6/1942 | Sweden | 137/516.15 |
| 2071818 | 9/1981 | United Kingdom | 137/514.5 |

Primary Examiner—Robert G. Nilson
Attorney, Agent, or Firm—William J. Beres; David L. Polsley; Robert J. Harter

[57] ABSTRACT

A compressor discharge valve assembly including a valve seat, a valve cage, and an annular ring-type valve operating therebetween. The valve cage includes a recess into which the valve retracts when in an open position, or in an alternative embodiment, the valve cage includes a lip portion for shielding the valve. In either embodiment, a reduction in valve flutter and the noise, known as chatter, which results from valve flutter is realized. The valve in alternative embodiments also includes an annular dished portion oriented toward the valve seat for directing the flow of discharge gas smoothly from the compressor and thereby further reducing valve chatter.

12 Claims, 4 Drawing Sheets

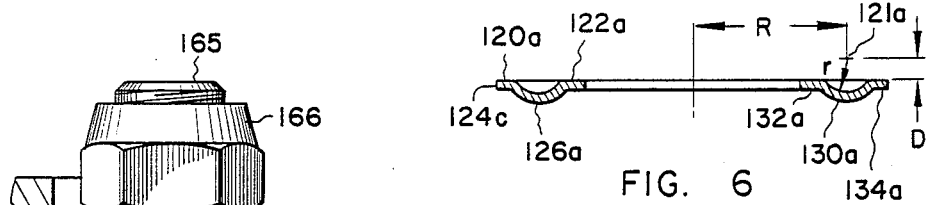
FIG. 6
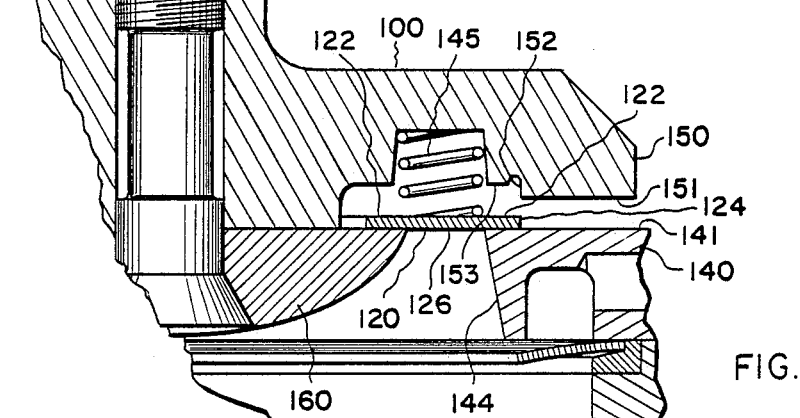
FIG. 3
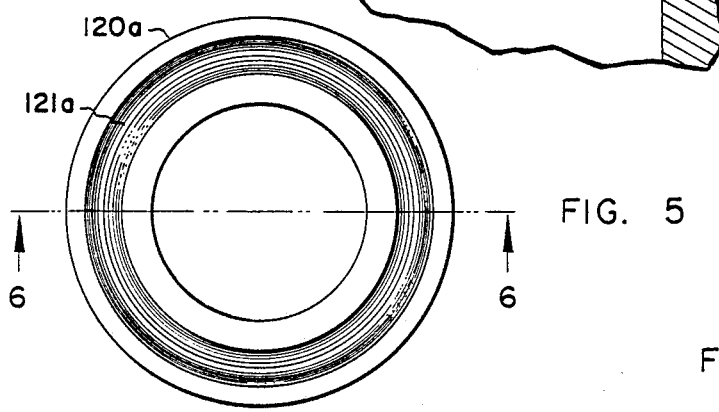
FIG. 5
FIG. 2
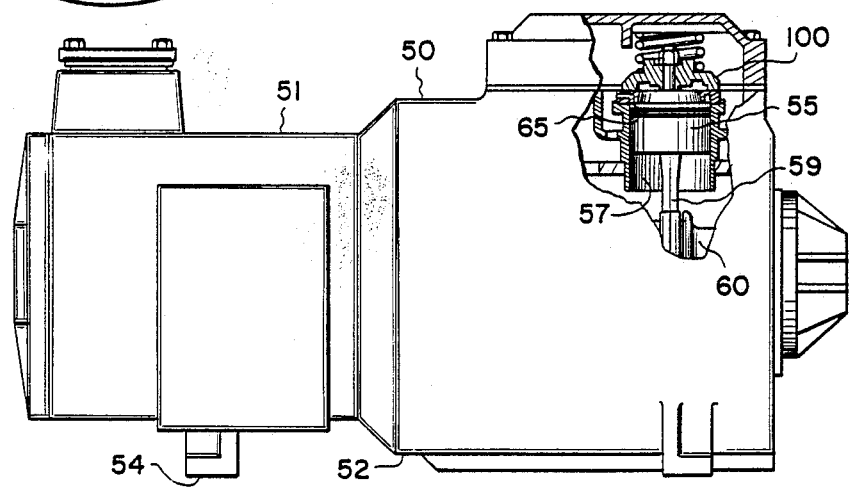

DISCHARGE VALVE FOR COMPRESSOR

DESCRIPTION

1. Technical Field

This invention generally relates to discharge valve assemblies for compressors and more specifically to those discharge valve assemblies including valves which are annular rings, biased toward a normally closed position, that employ means of reducing valve chatter noise.

2. Background Art

Compressor discharge valve assemblies of the ring type typically include a valve, a valve cage, and a valve seat having a port through which gas is discharged from the compressor. A valve is typically an annular ring biased such that the discharge port in the valve seta is sealingly covered by the valve until gas pressure against the valve exceeds the strength of the means biasing the valve against the valve seat. When this condition occurs, the valve is forced to an open position, and in this position it is generally forced against the valve cage. In the open position, the edge of such valves are typically exposed to the passage of gas as it is discharged. This often causes the valve to flutter, which generates an intermittent noise called chatter.

The flutter of such valves is a product of the interaction of the means biasing the valve, the pressure of the discharged gas, and the valve. Initial discharge of the gas forces the valve fully open. However, the sudden release of gas results in a slight decrease in pressure of the discharge gas and the biasing means, in combination with the pressure of the discharge gas as it flows behind the valve begins to force the valve toward the closed position. This reduces the effective area of the discharge aperture and causes an increase in gas pressure, again forcing the valve fully open. This cycle is of very short time duration and is repeated until the discharge of gas is completed.

The chatter noise resulting from this rapid cycling of the valve is due in some cases to the actual impact of the valve against the valve cage as it reaches the full open position. However, the chatter in many cases is due to excitation of the resonant or harmonic vibration frequency of the compressor and its structural components. This excitation is a product of the very rapid pressure fluctuation of the discharging gas.

Typical compressor discharge valve assembly design addresses valve flutter by selection of an appropriate spring constant for the means biasing the valve, and additionally, may provide in the valve cage a pad against which the valve rests in the open position in an attempt to minimize the impact component of chatter.

Some discharge valve assemblies include a valve cage which is secured to the valve seat. The valve cage in this type of valve assembly defines a recess in which the valve operates and discharged gas flows through and out of the discharge valve assembly. The recess is relatively large as compared to the valve and provides no shielding of the valve from the flow of discharge gas.

A typical design is exemplified by the prior art compressor discharge valve assembly generally denoted by reference numeral 10 and shown in FIG. 1 and 1A. A discharge valve 12 is operated within a relatively large recess defined in a valve cage 14. Refrigerant gas enters a compression chamber defined by a moveable piston 16 and a cylinder wall liner 18 through intake valve 20. Gas compressed in the compression chamber thus defined is discharged by the movement of valve 12 to an open position, permitting the gas to flow past the valve 12. Gas thus discharged flows through passages 22 defined in the valve cage 14, and exits the discharge valve assembly through a plurality of apertures 24 located about the centerline of the valve cage 14. The discharge valve 12 is retained in the cage 14 by a retainer 26, which is secured to the cage 14 by the combination of bolt 28 extending axially through the retainer 26 and the cage 14 with a tap 30 threaded thereon. A spring 32 operates to bias the valve 12 to a closed position, resting against the retainer 26 and a valve seat 34, upon which the valve assembly 10 is mounted. A pad 36 is retained in the cage 14 by a bracket 38 to provide a cushion for valve 12 in the open position. As clearly shown in FIGS. 1 and 1A, the thickness dimensions of this bracket 38 is substantially thin as compared to the thickness dimension t of valve 12 (0.025 versus 0.034") as well as removed from valve 12 a relatively large distance s (0.196" nominal separation between internal radius of valve 12 and external radius of bracket 38). No means of shielding the valve 12 to reduce the valve chatter is seen in this valve assembly 10, which relies instead upon the pad 36.

It is therefore necessary to supply additional sound deadening mufflers or insulating material in such designs to negate this chatter within the compressor, or conversely, the effectiveness of sound deadening mufflers and insulating materials in controlling the ambient sound level of the compressor is decreased by this chattering effect in the compressor.

Accordingly, it is an object of this invention to provide a valve which is shielded to reduce the flutter of the valve.

It is a further object of the invention to provide a valve with an annular formed portion for smoothly directing the flow of discharged gas from the compressor.

It is yet a further object to reduce the ambient sound level caused by the chatter of the valve while not requiring additional sound deadening mufflers or insulation.

It is also an object of the invention to achieve a compressor having quieter operation in a manner which does not increase the cost of the compressor, or decrease the operating efficiency of the compressor.

These and other objects of the invention will be apparent from the attached drawings and the description of the preferred embodiment that follows hereinbelow.

SUMMARY OF THE INVENTION

The subject invention is a discharge valve assembly for a compressor comprised of a valve cage, a valve seat with a discharge port therethrough, and an annular valve which is normally biased against the valve seat. Gas discharged through the discharge port in the valve seat forces the valve into a recess in the valve cage. The recess is sized for closely accepting the valve therein so as to shield the perhipheral edge of the valve from the discharged gas and thereby substantially reduce the flutter of the valve caused by the passage of the discharge gas. In an alternative embodiment, the valve is shielded by its retraction to a position closely adjacent a liplike portion of the valve backer. In a still further embodiment, the valve includes an annular dished portion oriented toward the valve seat for directing the flow of discharged gas more smoothly from the discharged port, so that the flutter of the valve is still further reduced.

BRIEF DESCRIPTION OF THE DRAWINGS

FIG. 2 is a partial cross-section of a motor driven reciprocating compressor showing a valve assembly in situ.

FIG. 3 is a cross-sectional view of the discharge valve assembly comprising the subject invention.

FIG. 5 is a plan view of an alternate embodiment of the subject invention.

FIG. 6 is a cross-sectional view of the alternate embodiment of FIG. 5.

DESCRIPTION OF THE PREFERRED EMBODIMENT

Figure 1:
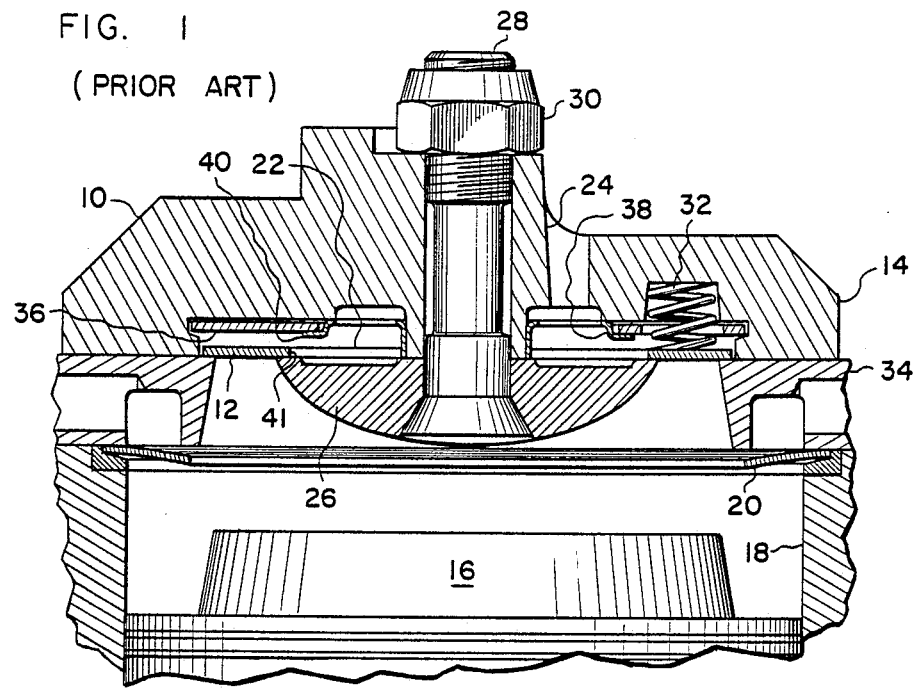
FIG. 1 shows a cross-sectional view of a compressor discharge valve assembly of the type known in prior art.
Figure 1A:
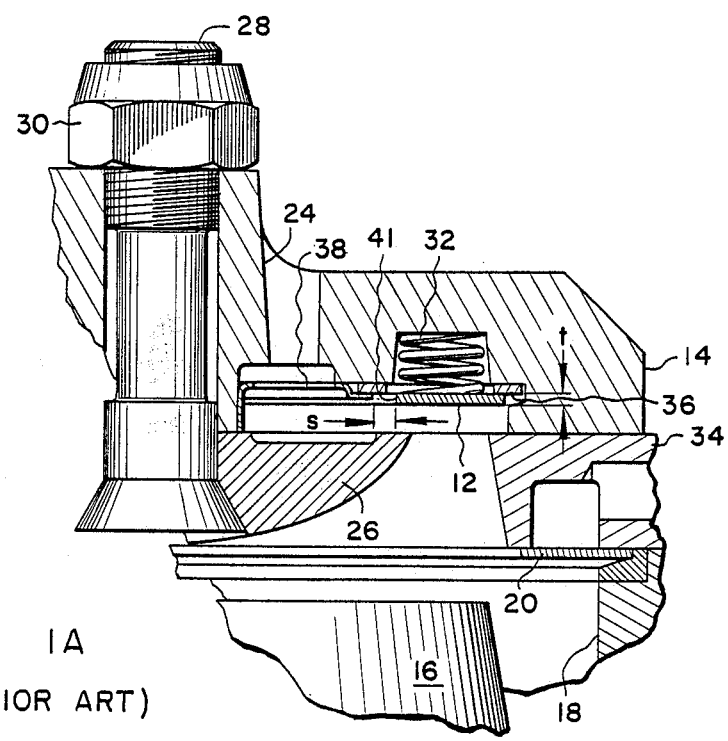
FIG. 1A is an enlarged partial cross-sectional view of the discharge valve assembly of FIG. 1.

A compressor system 50 of the reciprocating type is generally shown in FIG. 2. Compressor system 50 includes an electric motor disposed within motor housing 51 driving a multi-cylinder rciprocating type compressor disposed within compressor housing 52. The compressor system 50 is secured to a base (not shown) by means securing the compressor mounting feet 54. The means for mounting the compressor assembly 50 and the refrigeration system in which the compressor assembly 50 is used are not disclosed herein, being regarded as well understood and not necessary to understand the form and function of the subject invention. In a cutaway portion of the compressor system 50 one piston 55 is shown disposed within a cylinder wall 57. The piston 55 is connected by connecting rod 59 to crankshaft 60 which in turn is driven by the electric motor disposed within motor housing 51.

In operation, the piston 55 is drawn downward by the rotation of crankshaft 60, inducing suction through an intake check valve 65. As the crankshaft 60 continues to rotate the piston 55 is slideably forced upward in cylinder wall 57, closing intake valve 65 and compressing the refrigerant drawn in on the suction stroke. The refrigerant thereby compressed is then discharged through discharge valve assembly 100, which is shown and described more particularly hereinbelow. It is to be understood that the description of the compressor system 50 generally describes that used in the preferred embodiment, but that the details of the compressor system actually useful in embodying the subject invention may include, for example, an internal combustion engine as the motive means in lieu of the electric motor and a swash plate in lieu of the crankshaft and connecting rod, and that these or the like would be equally suitable for utilizing the subject invention.

Turning now to FIG. 3, the subject invention is disclosed in greater clarity. Discharge valve 120 is shown in a closed position resting against valve seat 140. A biasing means, such as coil spring 145 is disposed against an upper surface 122 of valve 120 and a recess in valve cage 150. A discharge port is defined in the discharge valve assembly 100 by a valve seat surface 141 in valve seat 140 and surface 151 in valve cage 150. A valve retainer 160 is secured by bolt 165 and nut 166, which communicate through valve retainer 160 and valve cage 150. Valve 120 has an edge 124 and valve cage 150 has a shielding surface 152 which cooperate to shield the discharge valve 120.

Figure 4:
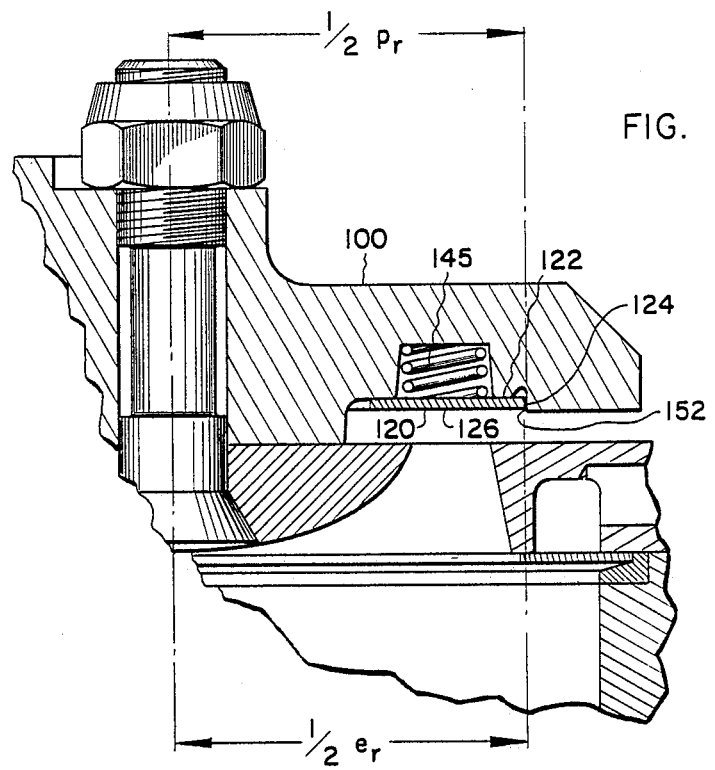
FIG. 4 is a cross-section view of the compressor discharge valve assembly of the subject invention shown in the shielded position.

In FIG. 4, valve 120 is shown in an open position with valve edge 124 immediately adjacent valve cage shielding surface 152. Valve 120 is manufactured in the form of a flat annular ring. The upper surface 122, edge 124 and lower surface 126 of valve 120 are smooth to prevent interference with valve caps 150 and permit smooth, non-binding operation of the valve between the closed position of FIG. 3 and open position shown in FIG. 4.

Figure 4A:
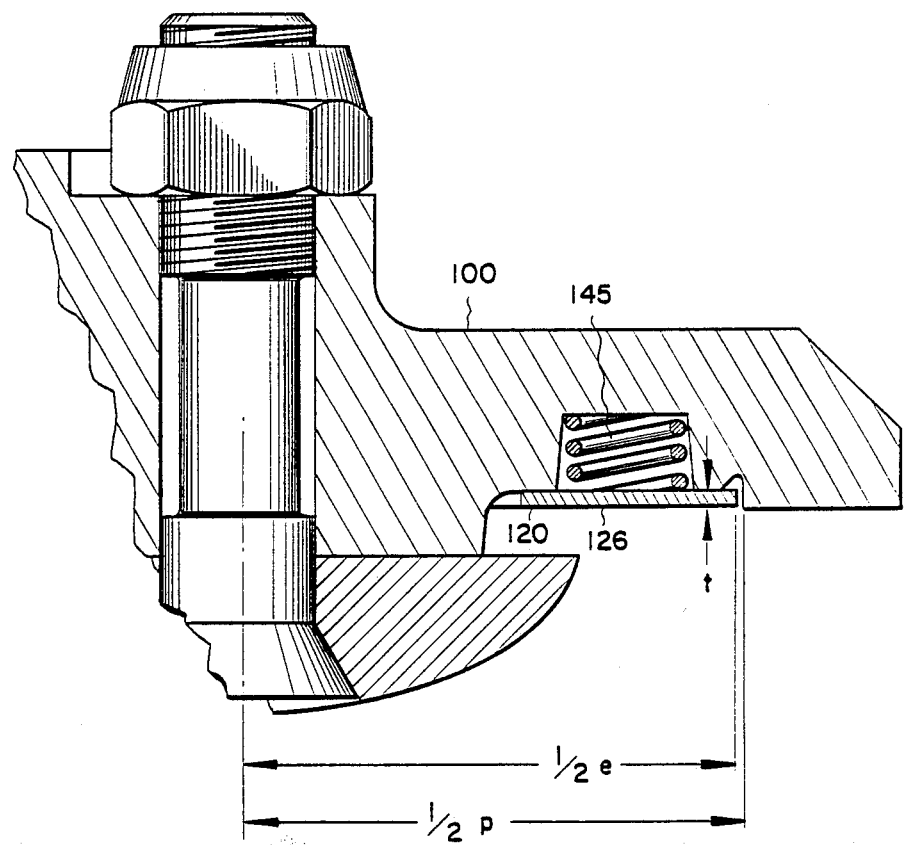
FIG. 4A is an enlarged partial cross-sectional view of the discharge valve assembly of FIG. 4.

FIGS. 4A indicates the relative sizing of the discharge valve 120 and the valve cage 150. The valve 120 has a thickness t which is the distance measured perpendicularly between the upper surface 122 and the lower surface 126 of the valve 120. The height of the shielding surface 152 must be of a dimension at least substantially equal to this thickness t of the valve 120, and in any embodiments including biasing means such as a spring 145, the height of the shielding surface 152 must be a thickness t plus the additional height required to accommodate these additional members. The shielding surface 152 of the valve cage 150 may be conveniently defined as a circular lip with a diameter p. The edge 124 of the valve 120 defines a circle with a diameter e, and the difference between the diameter p and the diameter e should preferably be within a range of 0.003 inches and 0.025 inches, for example, 0.005 inches, in order to achieve the desired shielding effect.

In the preferred embodiment, the valve cage shielding surface 152 comprises the outer peripheral edge of an annular recess 153 defined in valve cage 150. The outer peripheral edge of this recess is defined at diameter $p_r$ and is of a height substantially equal to the thickness t of the valve 120 to be accommodated in the recess 153. In this embodiment the edge 124 of the valve 120 is defined by a circle of diameter $e_r$. Edge 124 is machined to provide a close tolerance between the edge 124 and the shielding surface 152 of the valve cage 150. This close tolerance would be defined as a difference between $e_r$ and $p_r$ of 0.005 inch, again within the 0.003 inch to 0.025 inch range. The close tolerance between the valve 120 and the valve cage 150 provides a transition area between surface 126 of the valve 120 in surface 151 cooperating to present a relatively flush surface for directing gas discharging from the compressor system 50.

The operation of the discharge valve assembly 100, as shown in FIGS. 3 and 4, is as follows. In a reciprocating compressor, the operation of which has been previously described, the pressure of the refrigerant gas increases during the compression stroke of piston 55. At a preselected pressure, the spring constant of the coil spring 145 biasing the valve toward the closed position is overcome, and the valve moves to the open position shown in FIG. 4. At this point, compressed gas is released from the compression chamber defined by the piston 55 and the cylinder wall 57 and is directed by valve reatiner 160 and surface 144 of the valve seat 140 into the discharge passage defined by the valve lower surface 126, valve cage surface 151 and valve seat surface 141. Edge 124 of valve 120 cooperates with the valve shielding surface 152 of the valve cage 150 so that a relatively smooth discharge passage is defined.

As the compressed gas is released through the discharge passage thus defined, a decrease in the pressure of the discharging gas occurs and the valve 120 is again moved by the coil spring 145 toward the valve seat 140. This in turn increases the pressure of the discharging gas due to the constriction of the discharge passage area, and forces the valve 120 back to the full open position. By virtue of the shielding effect resulting from the cooperation of surface 124 and surface 152, the pressurized gas does not swirl behind the valve, but rather tends to be evacuated from behind the valve. This evacuation effect minimizes the tendency of the valve to move toward the closed position until the pressurized gas is fully discharged from the compression chamber, and thereby substantially minimizes chatter caused by the relatively rapid movement of the valve oscillating between the near open and the full open position. The evacuation effect is a venturi-like effect due to the close shielding of the valve 120 by the valve cage 150.

FIGS. 5 and 6 disclose two views of an alternate embodiment of the discharge valve 20. Discharge valve 120a has an upper surface 122a, an edge 124a, and a lower surface 126a. Valve 120a also includes an annular dished portion 121a which is coaxial with the annulus of the valve 120a. This annular dished portion 121a is arcuately dished a certain distance as defined by radius r, where the center point of radius r is offset a distance D from the upper surface 122a of valve 120a. In FIG. 5, it can be clearly seen that the dished portion extends fully about the annulus of valve 120a, the center line of radius r being circular at a radius R from the axis of the annulus of the valve 120a. The cross-section of the preferred embodiment of valve 120a is set forth in FIG. 6. Preferably, the values of r, R and D are selected such that a substantial portion of the lower surface 126a will be flat for providing an adequate seal between the valve 120 and the valve seat 140a.

As shown in FIG. 6, the annular valve element 120a has an arcuately dished annular portion 130a of radius R with the dished portion defined by the radius r, which has a center removed from the upper surface 122a by a distance D. This dished portion 130a is shown disposed in approximately in the center of the annulus 120a with two flanking planar annular portions, an inner portion 132a and an outer portion 134a. The two flanking annular portions 132a and 134a then rest sealingly upon the valve seat 34 when the annular valve member 120a is in the closed position.

Figure 7:
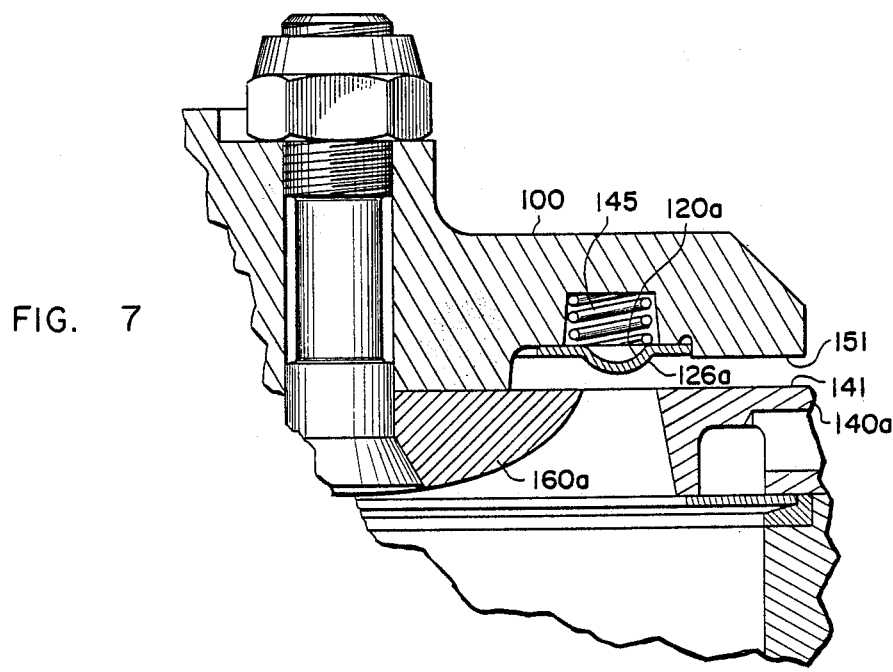
FIG. 7 is a cross-sectional view of a discharge valve assembly having the alternate embodiment shown in the shielded position.

The operation of the alternative embodiment of the valve 120a is substantially identical to that of the preferred embodiment of the valve 120. The alternate embodiment of valve 120a is shown in the open position in FIG. 7. This embodiment of the valve 120a reduces the flutter by directing the discharged gas toward the discharge port along the curve of the annular portion lower surface 126a. This enhanced directing effect increases the velocity of the discharging gas, which increases the evacuation or venturi effect upon the valve 120a. When the valve 120a is in the closed position (not shown) the dished portion is accommodated within the aperture defined by valve retainer 160a and valve seat 140a.

The shielding of the valve 120 and the alternative embodiment of the valve 120a provide inexpensive and easily implemented means for reducing the chatter encountered in a discharge valve assembly 100, by reducing the oscillation of the valve 120 and 120a caused by the pressure of the discharging gas upon valve 120 and 120a. In addition, the efficiency of the compressor system 50 is improved by increasing the discharge velocity and energy of the discharging gas. The substantial advantages of the subject invention over the known prior art are readily apparent in a compressor system such as compressor system 50 described above.

Modifications to the preferred embodiment of the subject invention will be apparent to those skilled in the art within the scope of the claims that follow hereinbelow.

I claim:

1. A discharge valve assembly for a gas compressor comprised of:
   a valve seat member defining a discharge aperture, said valve seat member further having a valve seating surface;
   a generally planar annular valve member having a thickness t and an edge having a diameter e, said valve member selectively engaging said valve seating surface in a closed position so as to sealingly cover said discharge aperture, and disengaging said valve seating surface in an open position so as to permit gaseous communication through said discharge aperture;
   a valve cage including annular lip portion having a height substantially equal to the thickness t of said valve member, said annular lip portion further defined by a diameter p where said diameter e of said valve member edge is slightly smaller than the diameter p of said lip portion, said annular lip portion accepting said valve member immediately adjacent said valve member in the open position so as to substantially reduce oscillation of said valve member and further so as to induce a venturi effect upon said valve member by gas communicating through said discharge aperture when said valve member is in the open position, whereby the gas communicating through said discharge aperture tends to maintain said valve member in the open position; and
   means for biasing said valve member to the closed position.

2. The discharge valve assembly as set forth in claim 1 wherein said discharge valve assembly presents a generally smooth surface discharge passage defined by said valve seat member, said valve cage and said valve member in the open position.

3. The discharge valve assembly as set forth in claim 2 wherein the difference between the diameter e of said valve member and the diameter p of the lip portion of said valve cage is within a range between 0.003 inches and 0.025 inches.

4. A discharge valve assembly for discharging gas from a gas compressor comprised of:
   a valve seat member defining a discharge aperture, said valve seat member further having a valve seating surface;
   a generally planar annular valve member having a thickness t, said valve member selectively engaging said valve seating surface in a closed position so as to sealingly cover said discharge aperture, and disengaging said valve seating surface in an open position so as to permit gaseous communication through said discharge aperture said valve member further defining a central dished portion oriented toward said discharge aperture a valve cage including annular lip portion having a height substantially equal to the thickness t of said valve member, said annular lip portion further defined by a diameter p immediately adjacent said valve member in the open position so as to substantially reduce oscillation of said valve member, said valve cage and said valve seat member defining a second discharge aperture for gas flow communication therethrough, whereby gas from said discharge aperture is directed by said dished portion toward the second discharge aperture when the valve is in the open position; and means for biasing said valve member to the closed position.

5. The discharge valve as set forth in claim 4 wherein said dished portion is comprised of a portion annularly dished in a substantially co-axial manner with said valve member and two generally planar annular portions.

6. The discharge valve assembly as set forth in claim 5 wherein said valve seat member receives said dished portion therein when said valve is in the closed position.

7. A discharge valve assembly for discharging gas for a gas compressor comprised of:

a valve seat member defining a discharge aperture, said valve seat member further having a valve seating surface;

a generally planar annular valve member having a thickness t and an edge defined by diameter er, said valve member selectively engaging said valve seating surface in a closed position so as to sealingly cover said discharge aperture, and disengaging said valve seating surface in an open position so as to permit gaseous communication through said discharge aperture;

a valve cage including an annular recess having a diameter of pr and a depth substantially equal to the thickness t of said valve member, where the diameter er of said valve member is slightly smaller than the diameter pr of said recess said valve cage accepting said valve member into said annular recess in a shielding manner in the open position so as to substantially reduce oscillation of said valve member and further so as to induce a venturi effect upon said valve member by gas communicating through said discharge aperture when said valve member is in the open position, whereby the gas communicating through said discharge aperture tends to maintain said valve member in the open position; and means for biasing said valve member to the closed position.

8. The discharge valve assembly as set forth in claim 7 wherein said discharge valve assembly presents a generally smooth surface discharge passage defined by said valve seat member, said valve cage and said valve member in the open position.

9. The discharge valve assembly as set forth in claim 10 wherein the difference between the diameter $e_r$ of said valve member and the diameter $p_r$ of the recess defined in said valve cage is within a range between 0.003 inches and 0.025 inches.

10. The discharge valve as set forth in claim 7 wherein said valve member further comprises a central dished portion oriented toward said discharge aperture such that gas from said discharge aperture is directed by said dished portion toward a second discharge aperture when the valve is in the open position, said second discharge aperture defined by an opening between said valve seat and said valve cage for gas flow therethrough.

11. The discharge valve as set forth in claim 10 wherein said dished portion comprises a portion annularly dished in a substantially co-axially manner with said valve member and two generally planar annular portions.

12. The discharge valve as set forth in claim 11 wherein said valve seat member receives said dished portion of said valve therein when said valve is in the closed position.

* * * * *

UNITED STATES PATENT AND TRADEMARK OFFICE
CERTIFICATE OF CORRECTION

PATENT NO. : 4,811,757

DATED : March 14, 1989

INVENTOR(S) : George W. Brandt

It is certified that error appears in the above-identified patent and that said Letters Patent is hereby corrected as shown below:

Column 1, line 17, "seta" should be --seat--.

Column 1, line 63, "FIG." should be --FIGS.--.

Column 3, line 32, "rciprocating" should be --reciprocating--.

Column 4, line 64, "reatiner" should be --retainer--.

Column 5, line 24, "20" should be --120--.

Claim 9, column 8, line 19, "10" should be --8--.

Signed and Sealed this

Twenty-eighth Day of November 1989

*Attest:*

JEFFREY M. SAMUELS

*Attesting Officer*   *Acting Commissioner of Patents and Trademarks*